Dec. 7, 1971   P. J. GEPFERT   3,624,965
END FINISHING APPARATUS
Filed March 30, 1970   4 Sheets-Sheet 1
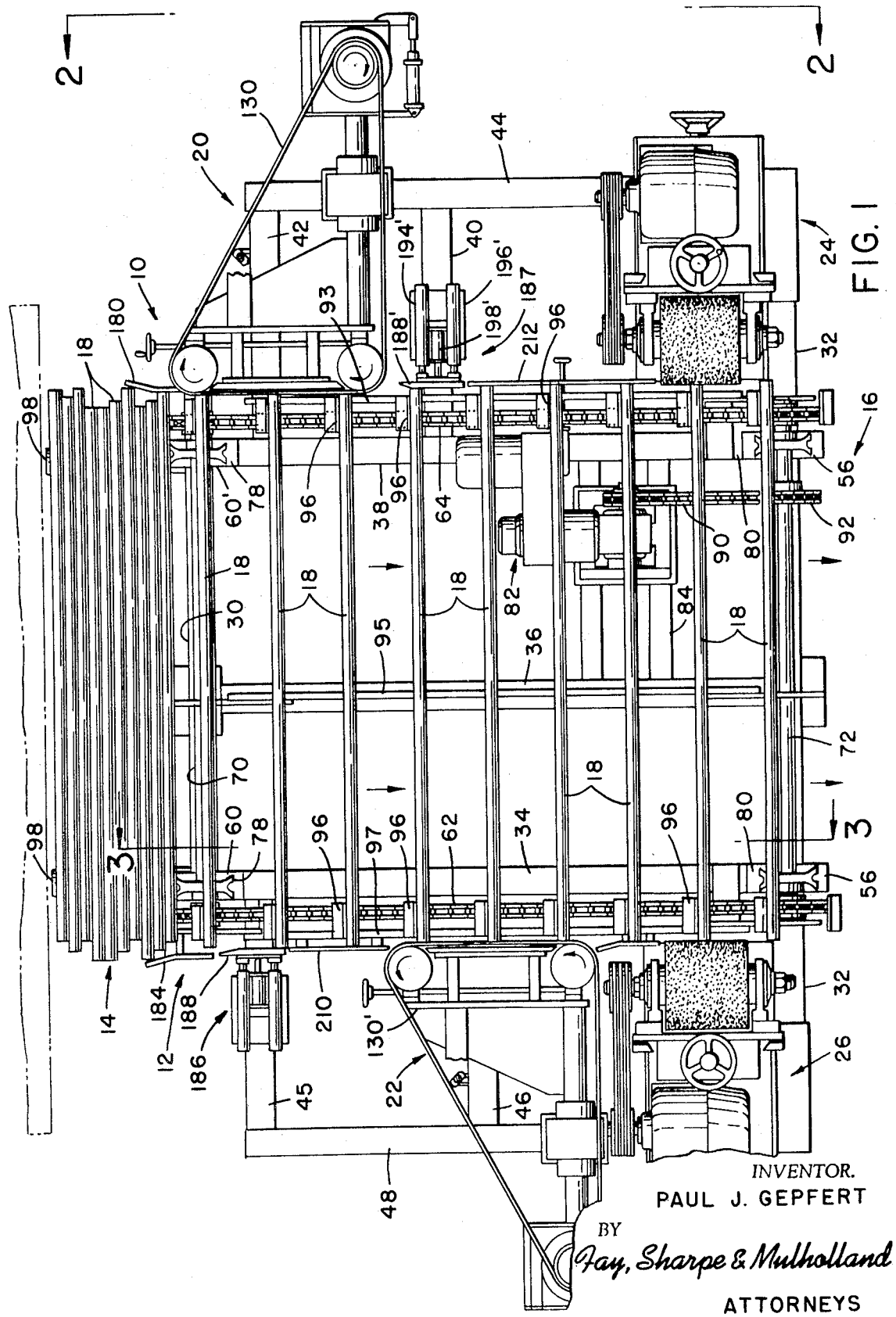
INVENTOR.
PAUL J. GEPFERT
BY *Fay, Sharpe & Mulholland*
ATTORNEYS Dec. 7, 1971  P. J. GEPFERT  3,624,965
END FINISHING APPARATUS
Filed March 30, 1970  4 Sheets-Sheet 2
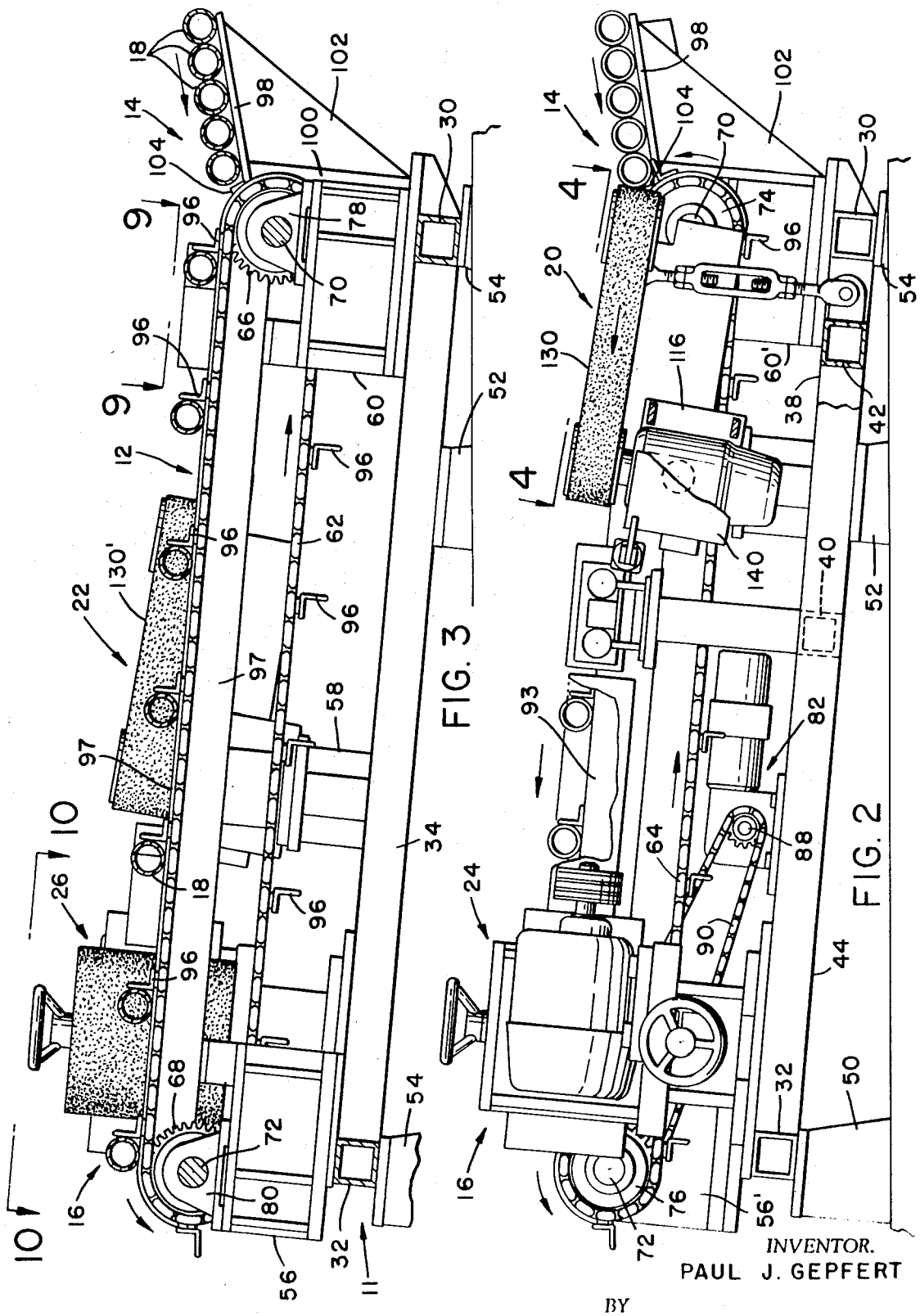
INVENTOR.
PAUL J. GEPFERT
BY
Fay, Sharpe & Mulholland
ATTORNEYS

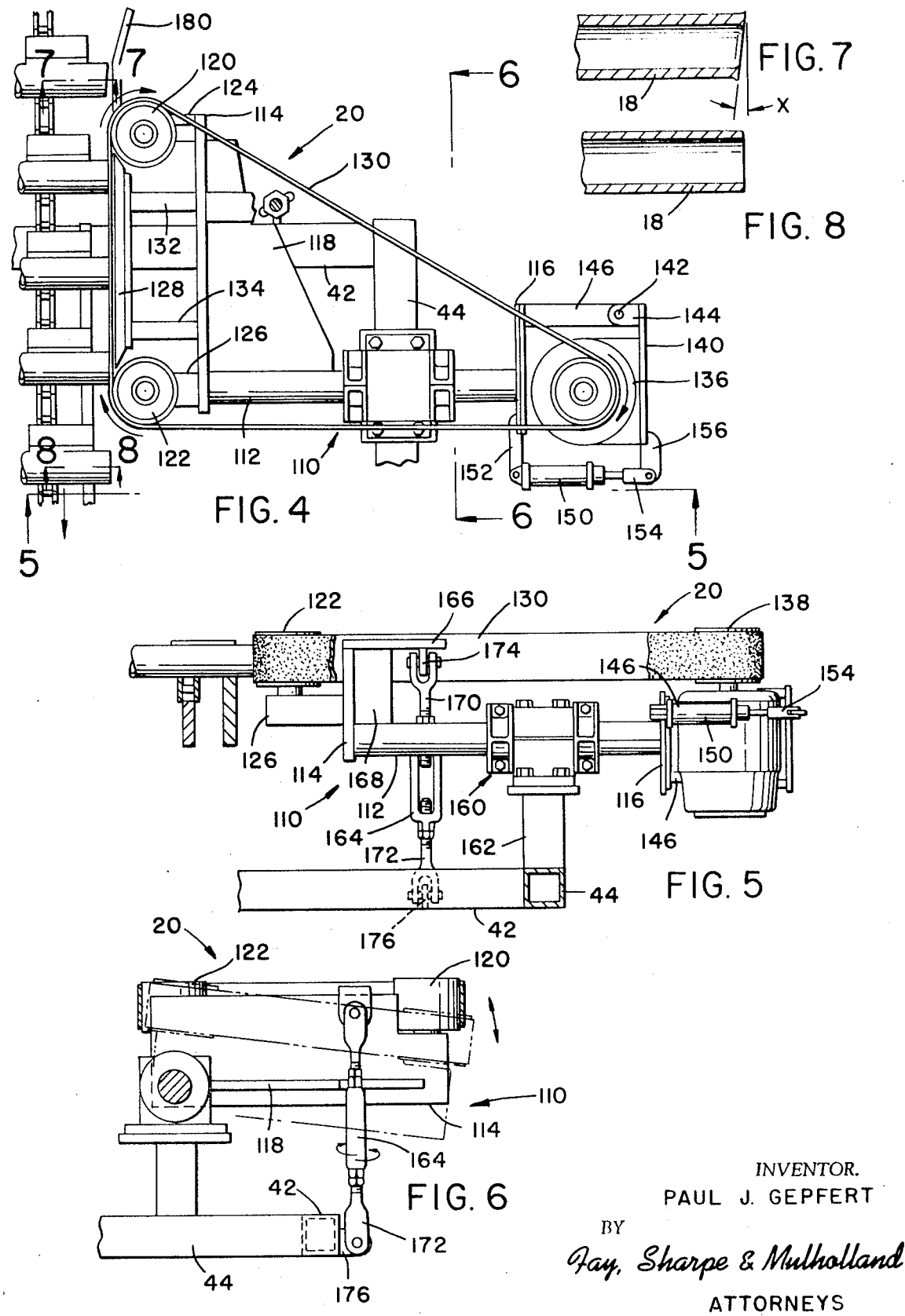

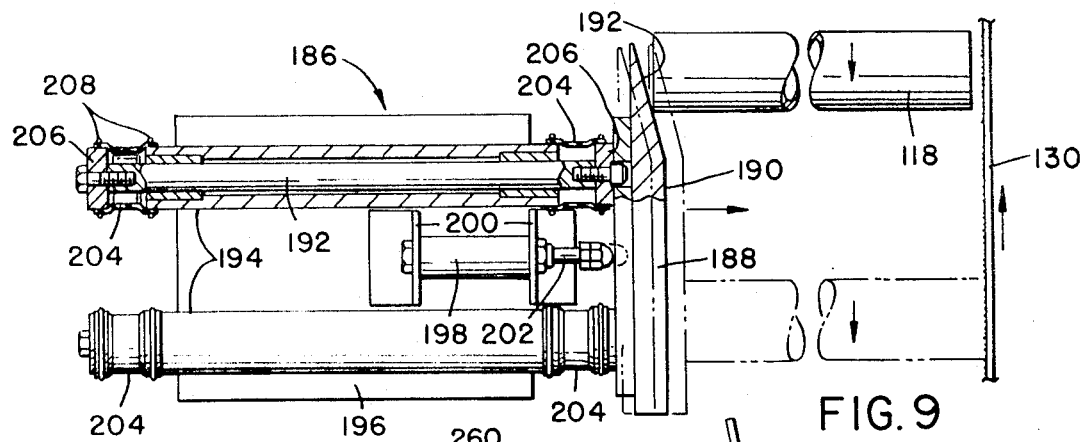
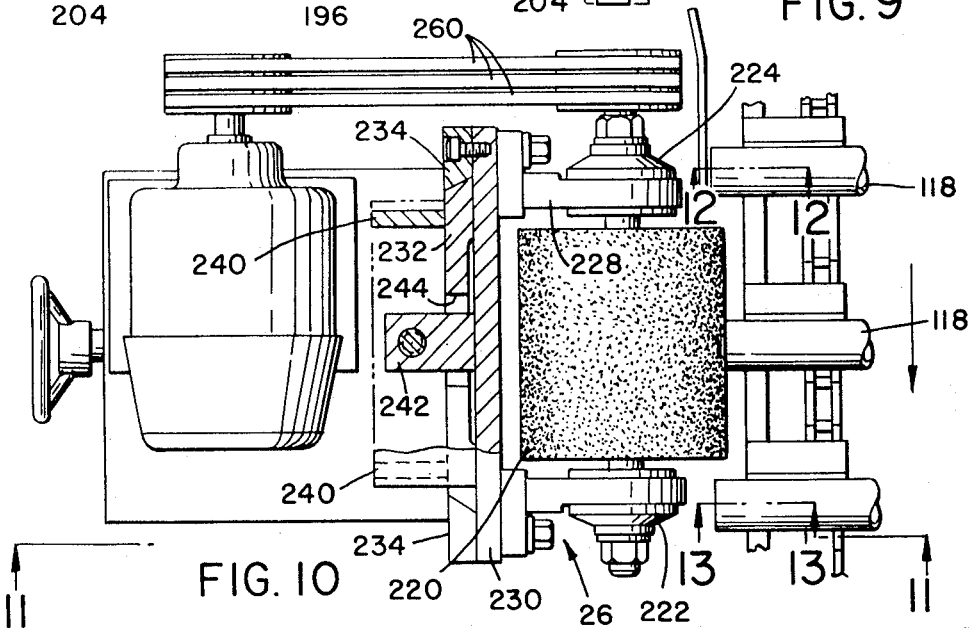
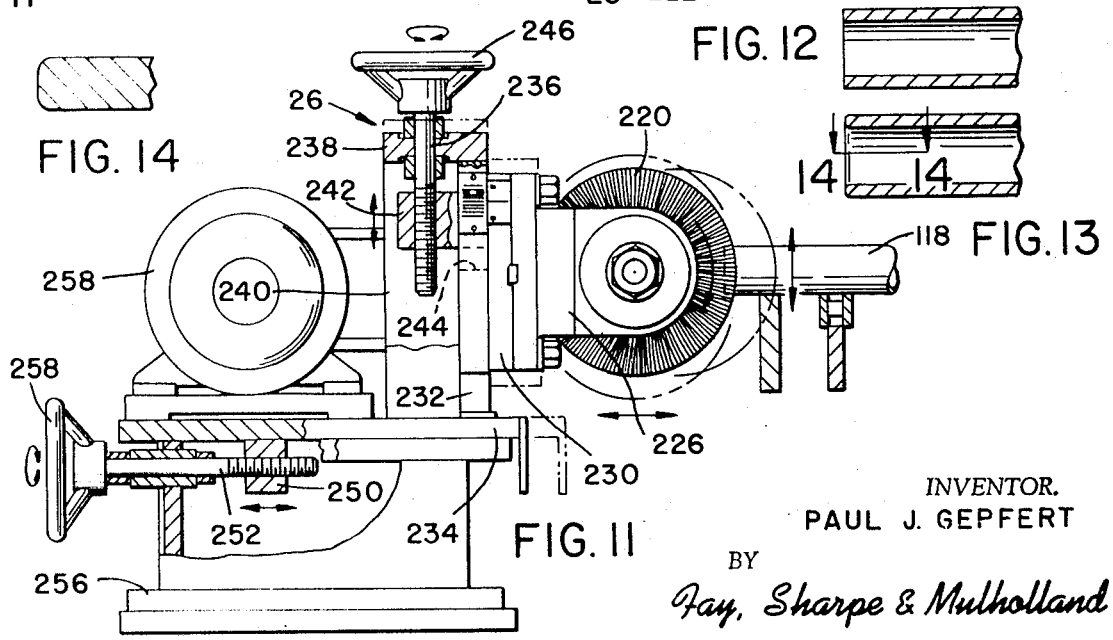

United States Patent Office 3,624,965
Patented Dec. 7, 1971

3,624,965
END FINISHING APPARATUS
Paul J. Gepfert, Shaker Heights, Ohio, assignor to
Loopco Industries, Inc.
Filed Mar. 30, 1970, Ser. No. 23,686
Int. Cl. B24b 7/00
U.S. Cl. 51—3
11 Claims

ABSTRACT OF THE DISCLOSURE

An apparatus for finishing the ends of elongated members such as rods, tubes, pipes or the like. The disclosed apparatus includes a conveyor which conveys the members along a path in parallel, side-by-side relationship. The conveyor is arranged to rotate the members about their longitudinal axes and move them past a first pair of endless belt abraders which are positioned on opposite sides of the conveyor and act sequentially on the opposite ends of the members. Associated with each belt abrader is an end positioning guide plate device which functions to properly locate the members. Mounted after the belt abraders are a pair of rotary belt abraders which are positioned directly opposite one another and simultaneously act on both ends of the members.

---

The subject invention is directed toward the metal finishing art and, more particularly, to an improved grinding and wirebrushing apparatus.

The invention is especially suited for deburring the ends of steel rods and will be described with particular reference thereto; however, as will become apparent, the invention is capable of broader application and could be used for finishing other types of products or parts.

After steel rods have been cut to a desired length, such as by shearing or sawing, the ends must often be finished to remove burrs and to condition the ends for further processing or use. In the past, many different devices have been used for this purpose. Typically, the prior devices have been less than completely satisfactory for many reasons.

The subject invention overcomes problems present in the prior deburring machines and provides an apparatus which can perform deburring very rapidly and produce a good end finish. Apparatus formed in accordance with the invention is comparatively simple to operate and maintain and can handle a variety of sizes of workpieces.

Broadly, the invention contemplates an apparatus for finishing the ends of elongated members such as tubes, rods, pipes and the like and comprised of a conveyor having an entrant end and an exit end for conveying the members along a path in parallel side-by-side relationship from the entrant end to the exit end with their longitudinal axes extending in a direction perpendicular to the path of movement. Positioned along one side of the path adjacent the entrant end is a first endless abrasive belt which has a working run extending parallel to the path of movement for engaging one end of the rods. Directly opposite the first belt is a positioner including a first guide plate which engages the opposite ends of the rods to move them into engagement with the first belt. Preferably, a second belt and guide plate combination is positioned immediately after the first in the direction of conveyor movement and arranged to engage the opposite ends of the rods. Adjacent the exit end of the conveyor there are preferably two rotary brush abraders with one mounted on each side of the path. The brush abraders which are desirably directly opposite one another and mounted with their axes of rotation extending parallel to the path of movement of the conveyor. The belts and brushes are provided with power means for driving them in directions such that the reaction force generated when they engage the members to cause the members to move toward the conveyor.

A more limited aspect of the invention contemplates that the conveyor will comprise a pair of spaced, endless conveyor members which extend in the direction of rod movement and along support rails adapted to engage and support the rods as they are moved along the path. Each of the endless conveyor members include uniformly spaced, outwardly extending dogs or pusher members which engage the rods and move them along the rails. The arrangement of the rails and dogs is such that the members tend to rotate (i.e. roll) about their longitudinal axis as they move through the apparatus.

Preferably, a more limited aspect of the invention contemplates that the belt abraders will be mounted for adjustable movement about an axis parallel to the axes of the members to allow adjustment of the working run of the belts so that the entire belt width will be utilized. Further, it is desirable that the working runs of the belts be mounted parallel to the path of movement and perpendicular to the axes of the rods.

Accordingly, a primary object of the invention is the provision of a high speed apparatus for finishing the ends of lengths of rods, pipe or the like.

A further object of the invention is the provision of a deburring apparatus of the type described wherein the abrading devices are related to the conveyor in a manner which eliminates the need for positive gripping of the parts by the conveyor.

Yet another object is provision of an abrading or deburring device including both abrasive belt and rotary brush abraders which act sequentially on the workpiece.

A still further object is the provision of an apparatus of the type described in which the workpieces are rotated about their longitudinal axes as the belt and brush abraders act on the workpiece ends.

Yet another object is the provision of an end finishing apparatus which is simple to operate and maintain.

These and other objects and advantages will become apparaent from the following description when read in conjunction with the accompanying drawings wherein;

FIG. 1 is a plan view of an end finishing machine formed in accordance with a preferred embodiment of the invention;

FIG. 2 is an end view of the machine shown in FIG. 1 (the view is taken on line 2—2 of FIG. 1);

FIG. 3 is a longitudinal cross-sectional view taken on line 3—3 of FIG. 1;

FIG. 4 is an enlarged plan view taken on line 4—4 of FIG. 2 and showing the right-hand belt abrader of the FIG. 1 embodiment;

FIG. 5 is a view taken on line 5—5 of FIG. 4;

FIG. 6 is a cross-sectional view taken on line 6—6 of FIG. 1 and showing in detail the mounting arrangement which permits variation in the orientation of the abrasive belt;

FIG. 7 is a cross-sectional view showing an example of the shape of a tube end as the tube enters the apparatus (this view would represent the appearance of the tube end such as at line 7—7 of FIG. 4);

FIG. 8 shows the tube end after passing past the belt-type abraders device and is taken for example on line 8—8 of FIG. 4;

FIG. 9 is an enlarged plan view of the end positioner or guide plate member associated with the first belt-type abrader;

FIG. 10 is an enlarged plan view of the left-hand rotary brush abrader (portions are broken away to more clearly shown certain features);

FIG. 11 is a cross-sectional view taken on line 11—11 of FIG. 10;

FIG. 12 is a cross-sectional view taken on line 12—12 of FIG. 10 and showing the typical appearance of a tube end as it enters the rotary brush abrader;

FIG. 13 is a cross-sectional view taken on line 13—13 of FIG. 10 and showing a tube end after the tube leaves the rotary brush abraders; and, FIG. 14 is a cross-sectional view taken on line 14—14 of FIG. 13 and showing in enlarged detail a portion of the tube end.

GENERAL DESCRIPTION OF PREFERRED EMBODIMENT

Referring in particular to FIGS. 1 through 3, it will be seen that in the embodiment under consideration, the apparatus includes a main, frame 10 which supports a continuously operable conveyor assembly 12. As shown in FIG. 3, the conveyor is slightly upwardly inclined from an inlet end 14 to an exit end 16. The conveyor 12 functions to convey tubes or the like upwardly along the inclined path in parallel side-by-side relationship with their longitudinal axes extending generally perpendicular to the path of movement. Note that in the embodiment shown, a group of tubes 18 are at the inlet end and are conveyed through the machine at uniform spacings. As will be explanned more fully, the tubes rotate about their longitudinal axes as they move through the machine.

During passage through the apparatus the tubes acted upon by a first rotary belt abrading apparatus 20 which is positioned closely adjacent the inlet end of the machine on the right side as viewed in FIG. 1. Immediately thereafter, in the direction of movement, a second belt abrading apparatus 22 in position to act on the opposite ends of the tubes.

Following the second belt abrader 22, there are a pair of rotary brush abraders 24 and 26 which are positioned on opposite sides of the conveyor and simultaneously act on both ends of the tubes passing therebetween.

Each of the various components mentioned above will be described in detail. In reading the detailed descriptions, it should be understood that although a specific form of construction is described, the details and arrangement could vary widely within the scope of the invention.

Frame assembly 10

In the embodiment under consideration, the frame 10 includes a base frame 11 which is formed primarily from rectangular box beams such as, for example, a first pair of end beams 30 and 32 which extend across the width of the apparatus and are connected by three longitudinal extending box beams 34, 36, and 38. Short sections of box beams are welded to the side of beam 38 and extend laterally outward. Note that there are short beams 40 and 42 extending outwardly from beam 38 adjacent the inlet end of the apparatus. A longitudinally extending beam 44 is welded to the ends of beams 42, 40 and the end beam 32 which extends outwardly a distance equal to beams 40 and 42. The opposite side of the apparatus has a similar outwardly extending support frame arrangement and includes two short beams 44 and 46 which are joined to a longitudinally extending beam 48 which extends from the end of beam 45 to the end of beam 32.

The base or sub-frame 11 is supported from weldment pedestals 50, 52 and 54 (see FIGS. 2 and 3), so that the frame is upwardly inclined from the entrance end 14 to the exit end 16. In the embodiment under consideration, the amount of incline is the range of 5 or 6 degrees.

Extending upwardly from the sub-frame members are a plurality of weldment type supports such as supports 56, 58, and 60, shown in FIG. 3. These supports carry the various conveyor components and the abrading devices. The arrangement of these portions of the frame will be described in more detail with the component of the particular assembly involved.

Conveyor assembly 12

In the embodiment under consideration, the conveyor assembly 12 includes a pair of laterally spaced chain members 62 and 64 which are simultaneously driven in the direction shown by the arrows. Conveyor chain 62 is trained about suitable sprockets 66 and 68 carried on shafts 70 and 72 respectively. The conveyor chain 64 is similarly trained about the sprockets 74 and 76 which are each mounted generally at the opposite end of shafts 70 and 72. It will be noted that the shafts are carried in bearings or pillow blocks 78 and 80. Referring to FIG. 1, it will be seen that two of the pillow blocks 78 are positioned adjacent the inlet end of the apparatus on the upwardly extending support members 60 and 60'. Similarly, two of the pillow blocks 80 are mounted at the exit end of the machine on the support members 56 and 56'.

Both of the chains 62 and 64 are simultaneously driven from a conventional variable speed motor and gear reducer unit 82 which is supported centrally between the chains by a pair of rectangular box beams 84 and 86 welded between the longitudinal frame members 36 and 38. As shown in FIGS. 1 and 2, the output shaft of motor-gear reducer unit 82 is connected through a sprocket 88 and a chain 90 with the horizontal shaft 72. A sprocket 92 is keyed or otherwise positively connected to the shaft 72 and is driven by the chain 90. Additionally, as can be appreciated, the sprockets 68 and 76 are also positively connected such as by keying or otherwise to the shaft 72. Accordingly, rotation of the shaft 72 causes simultaneous movement of the chains 62, 64 in a direction from the inlet to the outlet end of the apparatus.

In the embodiment under consideration, each of the chains 62, 64 are provided with a plurality of relatively uniformly spaced dogs or pusher members 96 which are small sections of angle connected to the chain links. As best shown in FIG. 1, the dogs 96 on each chain are arranged so as to be in alignment transversely of the path of movement.

Associated with the chains and arranged to support the tubes 18 as they move through the apparatus are three support rails 93, 95, and 97. The rails are carried by suitable weldments that extend upwardly from the base frame 11. As best shown in FIGS. 1–3, the rails are positioned parallel to the chains with their top surfaces slightly above the upper runs of the chains. Consequently, the tubes are supported entirely by the rails; however, the dogs extend above the rails for engagement with the tubes. As can be appreciated, the relationship between the dogs and the rails causes the tubes to be rolled along the rails with very little sliding. The importance of rotation will become apparent hereafter.

As best shown in FIG. 3, delivery of the pipes or tubes 18 to the inlet end of the apparatus by inclined guide plates 98 which are supported from vertical frame plates 100 and an angle brace member 102. As can be seen, the tubes move down the plates 98 under gravity and engage small tabs or plates 104 which stop them slightly before they would engage the conveyor chains. As the chains rotate through their respective orbits, the dogs 96 engage the lowermost pipe on the plate 98 and, as shown in FIG. 2, push it over the small tabs 104 so that it can be moved along the path of movement. The next pipe on the plate 98 then rolls down to the stop member 104 where it remains until the succeeding member 96 engages it.

Although the subject apparatus could be used for end finishing tubes and the like coming from many different machines, FIG. 7 shows a tube end configuration which results from certain types of cutoff operations and which must be end finished before the tube is in satisfactory shape for further processing or use. Note that the tube shown in FIG. 7 has had its end cut so that the plane of the cut is inclined by a small angle $x$ relatively to a desired plane which would be perpendicular to the longitudinal axis of the tube. Additionally, the corners of the tube end are flared outwardly. This type of end often results from certain shearing operations followed by rerolling of the tube end to a round configuration. The desired form of tube end would be as shown in FIG. 13. That is, the end face should be perpendicular to the longitudinal axis and the corners should be free of burrs.

Endless belt abraders 20 and 22

In the subject apparatus, the ends are finished by a combined endless belt and rotary brush abrading operation. As previously mentioned, the tubes are first acted upon by the endless belt-type abraders 20 and 22. Although the details of belt abraders 20 and 22 could vary widely, in the subject embodiment, they are both of the same construction except that they are mirror images of one another. Accordingly, only the abrader 20 will be described in detail; however, it is to be understood that abrader 22 is of the same construction. Also, parts identified in unit 20 are given the same reference numeral in the 22 device but differentiated therefrom by the addition of a prime (') suffix.

As best shown in FIGS. 4 through 6, the belt abrader 20 includes a frame 110 comprised of a first tube or shaft member 112. Welded to the opposite ends of the tube 112 are support plate members 114 and 116. A generally triangular shaped reinforcing plate 118 engages the right-hand side of plate 114 (as viewed in FIG. 4) and is welded to the member 112. A first pair of belt guide sheaves 120 and 122 are rotatably mounted on support members 124 and 126 which extend to the left from plate 114. Additionally, positioned between the guide sheaves 120 and 122 is a platen member 128 which engages the belt 130 substantially throughout the length of the back side of its working run between sheaves 120 and 122. It will be noted that the platen 128 is supported from plate 114 by a pair of outwardly extending support members 132 and 134.

Carried from the previously mentioned plate 116 is a standard electric drive motor 136 which has a drive sheave 138 keyed or otherwise positively connected to its vertically extending output shaft. It will be noted that the motor 136 is carried from a plate member 140 which is arranged for pivotal movement about a vertical axis by a vertical hinge pin 142 which passes through plate members 144 connected to plate 140 and an outwardly extending arm 146 welded to the support plate 116.

In order to maintain the belt 130 under a pre-determined tension, the motor is continually biased in a counter-clockwise direction as viewed in FIG. 4 by a small single acting air cylinder 150 mounted with its cylinder end pivotally carried from a bracket 152 welded to plate 116. The piston rod of cylinder 150 is connected through a clevis 154 with a bracket 156 welded or otherwise positively connected to plate 140. As can be appreciated, by supplying air at a controlled pressure to cylinder 150 the motor is given a bias in a counter-clockwise direction to control the tension on belt 130.

In order that the entire width of belt 130 is used and, additionally, to produce a reaction force on the tubes 118 to maintain them in engagement with the dogs 96, the belt is preferably inclined so as to engage the ends of the tubes at a slight downward angle relative to the conveyor 12. As best shown in FIGS. 2 and 3, the belts 130 and 130' are arranged so that at least the working run portions are moving in a direction opposite to the movement of the tubes and at an angle downwardly from the exit toward the entrance end of the conveyor. To accomplish this, the belt abrader frame 110 is mounted for pivotal adjustment about a horizontal axis perpendicular to the path of movement of the tubes. As best shown in FIGS. 4 through 6, the horizontal tubular frame member 112 of frame 110 is adjustably carried in a split sleeve or bearing 160 mounted on a suitable support member 162 which extends upwardly from frame member 44. The frame is also supported by a turn buckle 164 which extends from frame member 42 to a plate 166. As shown, the plate member 166 is welded to plate 114 and extends laterally therefrom. A small reinforcing plate 168 is welded between plate 166 and the triangularly shaped plate 118. The turn buckle has clevis end portions 170 and 172 which are respectively pinned to a bracket member 174 which is joined to the underside of plate 166 and a bracket 176 welded to frame member 42. By adjusting the turn buckle 164, the entire frame of the belt abrader 20 can be adjusted to provide substantially any desired angle to the working run of belt 130.

Positioning or guide assemblies

In order that the tubes 18 are properly engaged by the belt 130, a first pair of guide plates 180 and 182 are positioned at the inlet end of the conveyor. As best shown in FIGS. 1 and 4, the guide plates have inclined portions adapted to engage the ends of the tube entering the machine and shift them along their longitudinal axis to generally center them relative to the conveyor. This roughly locates the tube relative to the first belt abrader 20. A final locationing and proper engagement of the tube end with the belt is assured by a reciprocated end positioning guide or plate assembly 186. As can be seen in FIG. 1, the guide plate 186 is positioned directly opposite the abrader 20 to engage the tube and move it along its longitudinal axis toward the working run of belt 130.

A second reciprocated guide plate assembly 188 is associated with the endless belt abrader 22 and positioned directly opposite its working run. Each of the reciprocated guide plates members 186 and 188 are, in the embodiment shown, of identical construction except for being of mirror image relative to one another. Accordingly, only assembly 186 will be described in detail but its description is to be taken as equally applicable to assembly 188. Additionally, like parts of assembly 188 will be given the same reference numeral but differentiated from the parts of assembly 186 by the addition of a prime (') suffix.

FIG. 9 is a detailed showing of the reciprocated guide plate assembly 186. As shown, assembly 186 includes a rigid guide member 188 which is positioned so that its guide face 190 extends generally parallel to the path of movement of tubes 118. The entrance end of the guide plate 188 is inclined as shown at 192. The normal, or retracted position, of guide plate 188 is as shown in FIG. 1. Note that the inclined end or face of the guide surface 190 is generally in alignment with the guide plate 184. Thus, as the tubes 118 pass by plate 184, they engage the inclined surface 192 and are caused to move longitudinally to the right as viewed in FIG. 1. When the tubes reach the main guide surface of the guide member 188, the member is actuated to the right to push the tubes to their final location with their opposite end properly engaged with the working run of belt 130.

The actuation of the plate 188 could be accomplished with many different types of arrangements; however, in the embodiment under consideration the plate 188 is carried on the ends of a pair of horizontally positioned rods 192 which are mounted for sliding movement in a pair of sleeves 194 joined to a base plate 196. Base plate 196 is suitably supported from the frame member 45. The guide plates 188 are actuated by an air cylinder 198 carried by a pair of brackets 200 positioned between the sleeves 194. The piston rod 202 is arranged so that upon actuation of cylinder 198 it will engage guide plate 188 and move it outwardly a desired amount. Note that the ends of the piston rod 202 are provided with an acorn nut which acts against the back of plate 188. Retraction of the plate 188 is accomplished by resilient tubular sleeves 204 which extend between the ends of sleeves 194 and flange portions or discs 206 connected to the opposite ends of shaft 192. Preferably, the portions 204 are removably connected to the associated members by rings 208. As can be appreciated, actuation of the cylinder 198 causes the plate to be moved to the right and, simultaneously elongates the innermost sleeve 204 which cause a retraction of the plate 188 when the supply of air to cylinder 198 is stopped. The controls used for actuating cylinder 198 at the proper time, could be of many types such as, for example, micro-switches positioned to engage the tubes as they are moved along by the conveyor which, in turn, actuate a solenoid type air control valve. Additionally, by controlling the pressure of the air supplied to cylinder 198, the force with which the tubes engage the belt can be regulated.

Referring again to FIG. 1, it will be seen that after the tubes 18 have been moved into engagement with belt 130, they are maintained in engagement throughout the length of the working run by the guide plate 190 and a fixed position guide plate 210 which extends upwardly adjacent the side of the conveyor in alignment with the inward position of the guide plate 188. Immediately after leaving the belt abrader 20, the opposite ends of the tubes 118 are engaged by the belt abrader 22. The tubes 118 are moved into engagement with the working run of the belt 130' by the guide plate assembly 187 which, as previously mentioned, is constructed and arranged to operate in the same manner as guide plate assembly 186. The guide plate assembly 187, in combination with fixed position guide plate member 212 maintain the tubes properly engaged with belt 130' throughout its working run. Additionally, because of the arrangement of the conveyor, the tubes are rotated substantially continuously during the time they are being acted upon by the conveyor.

Rotary brush abraders 24 and 26

After passing through the endless belt abraders 20 and 22, both ends of the tubes will have been finished to approximately the shape shown in FIG. 8. That is, the ends of the tubes will be perpendicular to the longitudinal axis and the corners will be relatively sharp and, additionally, small burrs may be present. To eliminate the burrs and remove the sharp corners, the tubes are passed between the rotary brush abrading units 24 and 26. Each of the abraders 24 and 26 are of substantially identical construction but, in the embodiment shown, are mirror images of one another. Although the rotary brush abraders could have many specific constructions, the preferred construction is shown in FIGS. 10 and 11 which illustrate, in detail, the brush abrader 26 which is positioned at the left-hand side of the conveyor as viewed in FIG. 1. In the embodiment shown, each of the units 24 and 26 includes a relatively large diameter, elongated wire brush 220 which is mounted for rotation about an axis extending parallel to the path of movement of the tubes. In normal operation, the brush is rotated in a direction to force the tubes downwardly against the conveyor. As shown, the brush 220 is rotatably mounted in suitable bearings 222 and 224 carried, respectively, in brackets plates 226 and 228. The bracket members 226 and 228 are each bolted to a vertically extending support plate 230. The plate 230 is mounted for vertical adjustment so that the position of the wire brush 220 can be varied to obtain the most desirable contact with the tubes and to permit the apparatus to be used for workpieces of different diameters. The adjustment is accomplished by mounting the plate 230 so that it can slide vertically on the plate 232 which is welded or otherwise positively connected to a horizontally extending base plat 234. Referring to FIG. 10, it will be seen that the plate 232 is provided with tapered vertical edges which are slidably engaged by correspondingly tapered guide members 234 connected to the lateral edges of plate 230. In the embodiment under consideration, adjustment movement is provided by a rotatable screw 236 which extends vertically downward from a plate 238 connected to the top of plate 232. Plate 238 is also supported at its opposite ends by vertically extending plate 240. The threaded lower end of the screw 236 passes through a threaded opening formed in an arm portion 242 which is connected to the back of plate 230. As shown, plate 232 is provided with a vertically extending opening 244 through which the member 242 passes. A hand wheel 246 at the upper end of the screw 236 permits rapid adjustment of the vertical position of the brush 220.

In addition to the vertical adjustment, the brush 220 is mounted so that it can be shifted horizontally to provide different contact pressure with the ends of the tubes and to allow the length of the tubes handled to be varied. For this reason, the base plate 234 is mounted for horizontal sliding movement by a guideway arrangement formed generally in the same manner as the vertical guideway discussed above. Note that a member 250 extends downwardly from the undersurface of plate 234. A threaded screw 252 is carried in suitable bearings formed in the base support 256 and passes through a threaded opening in member 250. A hand wheel 258 is connected to the outer end of the screw 252 for rapid adjustment of the screw.

The brush 220 is rotated so as to move in a clockwise direction as viewed in FIG. 10. That is, it acts downwardly against the end of the tube 118 and maintained in contact with the conveyor during the brushing operation. In the embodiment under consideration, the brush 220 is driven by a standard electric motor 258 carried on plate 234. The motor 258 is drivingly connected to the brush 220 by the belts 260. Normally, the brush is continuously driven during operation of the machine and no special controls need to be provided. Of course, it is possible to provide for intermittent operation of the brushes, if desired.

Normally, after passing between the rotary brush abraders 24 and 26, the ends of the tubes will have a configuration generally as shown in FIGS. 13 and 14. The rotation of the tubes during their passage past the brushes assures that all sharp corners and/or burrs are removed entirely about the tube end. After passing between the tube abraders, the tubes 118 are discharged from the end of the apparatus to any desired of storage and/or handling system. If desired, the conveyor could, of course, be extended to any desired length to deliver the tubes to any point for further processing or handling.

The invention has been described in great detail sufficient to enable one of ordinary skill in the finishing art to make and use the same. Obviously, modifications and alterations of the preferred embodiment will occur to others upon a reading and understanding of the specifications and it is my intention to include all such modifications and alterations as part of my invention insofar as they come within the scope of the appended claims.

Having thus described my invention I claim:

1. Apparatus for finishing the ends of elongated metal members, such as tubes, rods, pipes or the like, comprising:

a conveyor having an inlet end and an exit end for conveying the members along a path in parallel side-by-side relationship with their longitudinal axes extending generally perpendicular to the path of movement;

a first endless belt-type abrader positioned adjacent the inlet end with the working run of the belt lying in a plane generally parallel with the path for engaging a first end of said members;

first guide plate means positioned opposite said first belt-type abrader for engaging the second ends of said members to maintain their first ends in engagement with the working run of said belt;

a second endless belt-type abrader positioned adjacent said conveyor on the side opposite said first abrader with its working run lying in a plane generally parallel to the path of movement for engaging the second end of said members;

second guide plate means positioned opposite said second belt-type abrader for engaging the first ends of said members and maintaining their second ends in engagement with the working run of the second belt; and, rotary brush abrading means positioned adjacent the exit end of said conveyor for acting on both ends of said members, said rotary brush abrading means being rotated in a direction such that the reaction forces generated tends to force said members toward said conveyor.

2. The apparatus as defined in claim 1 wherein said conveyor is slightly upwardly inclined from said inlet end to said dependent exit end, and wherein said conveyor includes continuously moving spaced pushers and fixed support rails on which said members rest.

3. The apparatus as defined in claim 1 wherein said conveyor causes said members to rotate about their longitudinal axis as they move along said path.

4. The apparatus as defined in claim 1 wherein said belts are moved in endless orbital paths such that their working runs move in a direction opposite the path of movement of said members.

5. The apparatus as defined in claim 1 wherein said first guide plate means includes:

a guide surface lying in a plane generally perpendicular to the axes of said members; and, means for moving said guide surface toward the first belt-type abrader.

6. The apparatus as defined in claim 1 wherein the working runs of said belts move in a direction generally downwardly and opposite to the path of movement of said members.

7. The apparatus as defined in claim 1 wherein said rotary brush means act on both ends of said members simultaneously.

8. The apparatus as defined in claim 1 wherein said conveyor includes at least a pair of spaced simultaneously driven chains having pusher plates extending outwardly, said chains being associated with horizontally extending support rails which support said members as said pusher plates move the members.

9. Apparatus for finishing the ends of elongated rods, tubes, pipes or the like comprising:

a conveyor having an inlet end and an exit end for conveying the members along a path in parallel side-by side relationship with their longitudinal axes extending generally perpendicular to the path of movement;

a first endless belt type abrader positioned adjacent the inlet end with the working run of the belt lying in a plane generally parallel with the path for engaging a first end of said members;

first guide plate means positioned opposite said first belt-type abrader for engaging the second ends of said members to maintain their first ends in engagement with the working run of said belt;

rotary brush abrading means positioned adjacent the exit end of said conveyor for acting on both ends of said members, said rotary brush abrading means being rotated in a direction such that the reaction forces generated tends to force said members toward said conveyor;

said guide plate means including means to move said members in a direction along their axis toward the working run of said belt.

10. Apparatus as defined in claim 9 including means to adjust the working run of said belt about an axis perpendicular to the axes of said members.

11. Apparatus as defined in claim 10 wherein said rotary brush means are mounted for rotation about an axis parallel to the path of movement of said members, and means for adjusting the position of said rotary brush means.

References Cited
UNITED STATES PATENTS

| | | | |
|---|---|---|---|
| 2,109,450 | 3/1938 | Schlayer et al. | 51—5 |
| 3,169,352 | 2/1965 | Smith | 51—87 |

WILLIAM R. ARMSTRONG, Primary Examiner

U.S. Cl. X.R.

51—138